UNITED STATES PATENT OFFICE.

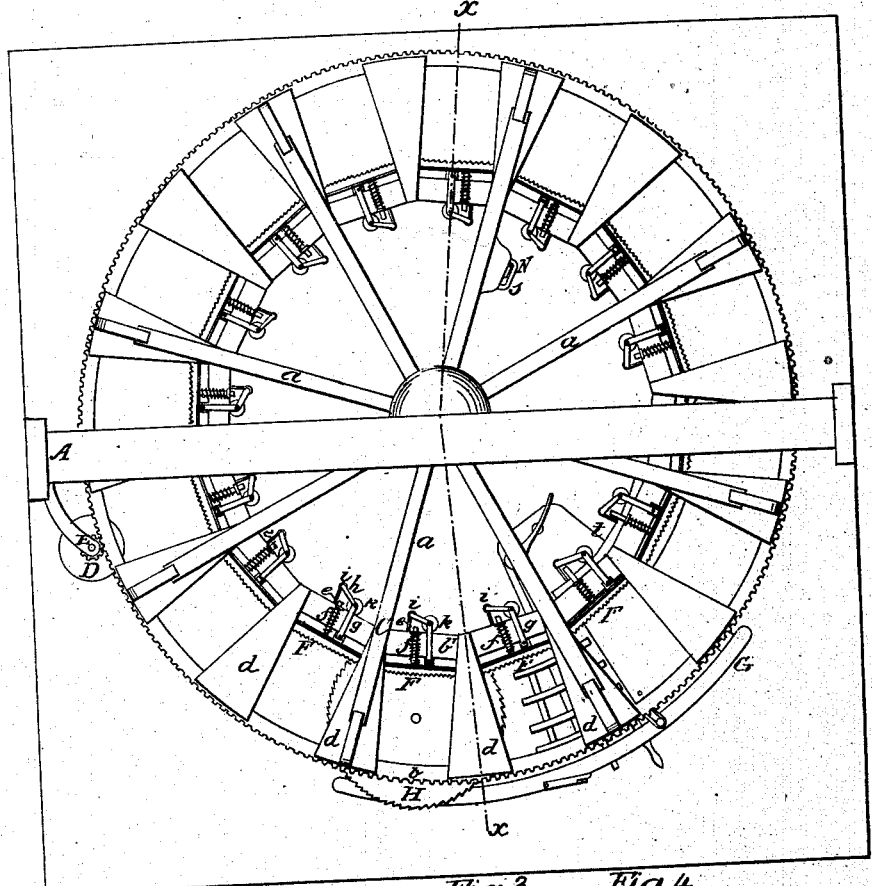

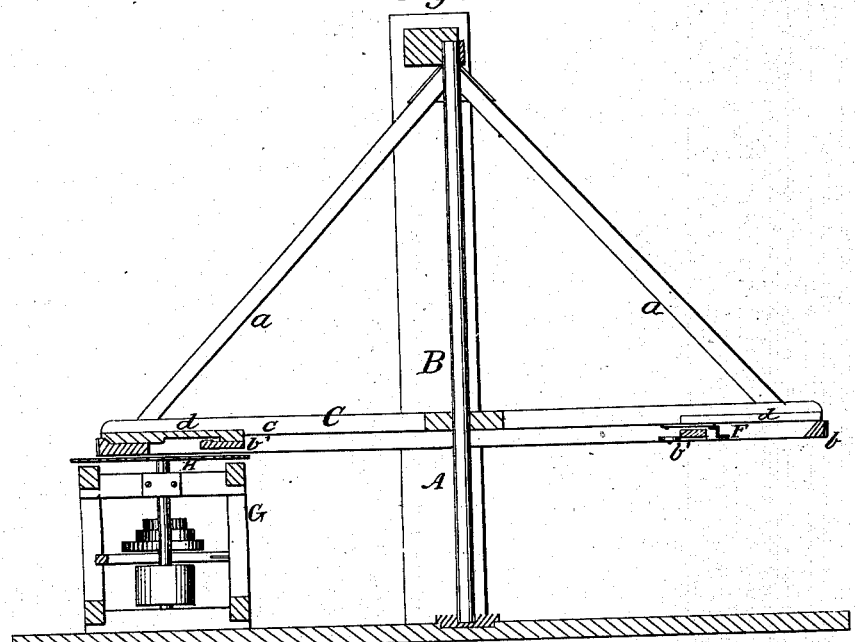
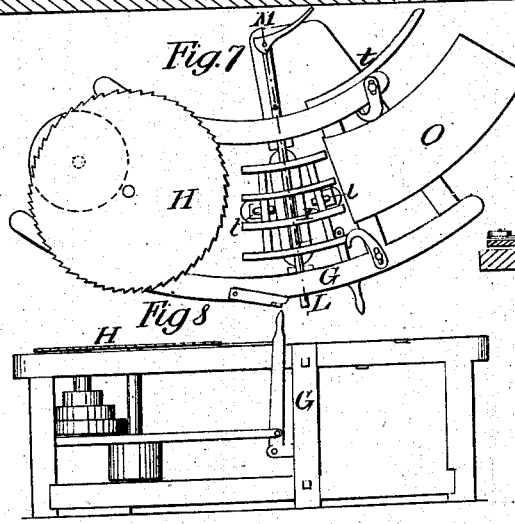
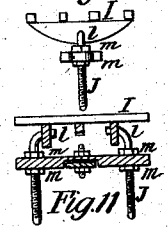
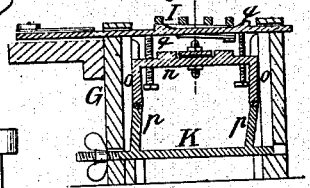

GEORGE CHALLONER, OF OMRO, WISCONSIN.

IMPROVEMENT IN SHINGLE-MACHINES.

Specification forming part of Letters Patent No. 49,228, dated August 8, 1865.

*To all whom it may concern:*

Be it known that I, GEORGE CHALLONER, of Omro, in the county of Winnebago and State of Wisconsin, have invented a new and Improved Shingle-Machine; and I do hereby declare that the following is a full, clear, and exact description thereof, which will enable those skilled in the art to make and use the same, reference being had to the accompanying drawings, forming part of this specification, in which—

Figure 1, Sheet No. 1, is a plan on top view of my invention; Figs. 2, 3, 4, and 5, enlarged sections pertaining to the same; Fig. 6, Sheet No. 2, a vertical section of the same, taken in the line $x\,x$; Fig. 7, a detached plan or top view of the circular saw and adjustable bed pertaining to the same; Fig. 8, a side view of Fig. 7; Fig. 9, a transverse vertical section of Fig. 7, taken in the line $y\,y$; Figs. 10 and 11, detached views of the adjustable bed pertaining to the same.

Similar letters of reference indicate corresponding parts.

This invention relates to a new and improved machine for sawing shingles, and of that class in which a series of bolts are placed upon a horizontal rotating wheel and acted upon by a horizontal circular saw placed underneath the wheel.

The object of the invention is to obtain a shingle-machine of the class specified which will operate with but little friction, perform its work rapidly, and set the bolts automatically, so that the shingles will be cut in proper taper form.

A represents a framing, which may be constructed in any proper manner to support the working parts of the machine, and B is a shaft which has a vertical position in the framing A, and has a horizontal wheel, C, upon it, braced from the top of shaft B by oblique bars $a$.

The wheel C is composed of two concentric rims, $b\,b'$, attached to radial arms $c$, which project horizontally from the shaft B. The two rims $b\,b'$ are connected by radial strips $d$, of taper form, placed at suitable distances apart, the spaces between the strips, owing to the taper form of the latter, being of equal width throughout their entire length, as shown in Fig. 1.

The outer rim, $b$, is toothed at its outer edge, and has a pinion, D, gearing into it, which pinion is on a vertical shaft, E. The inner rim, $b'$, is of polygonal form, a straight side being at the inner end of each space between the strips $d$, as shown in Fig. 1. Each of these spaces between the strips $d$ is provided at its inner end with a serrated jaw, F, having a rod, $e$, projecting horizontally from it, with a spiral spring, $f$, thereon. These springs have a tendency to keep the jaws F pressed toward the outer rim, $b$. The jaws F are connected by rods $g$ to cranks $h$, which are at the upper ends of shafts fitting in bearings $i$ at the inner edge of the rim $b'$. The lower ends of these shafts also have cranks $j$ on them, with rollers $k$ at their ends.

G is a frame, which may be of segment form, and has a shaft, H, fitted vertically in it, on which a circular saw, H', is placed, said saw being at the top of the frame G and directly underneath the rims $b\,b'$. In this frame G there is also placed a tilting bed, I, which is fitted and works freely on journals $l\,l$ at the upper ends of screw-rods J, having jam-nuts $m$ on them, said screw-rods passing through a plate, $n$, which has a pendent bar, $o$, at each end of it, said bars $o$ being connected by pivots to arms $p$ on a sliding shaft, K, which is adjusted by a screw and nut, as shown clearly in Fig. 9. By means of this sliding shaft K the plate $n$ may be raised and lowered as desired, and consequently the bed I.

L represents a sliding bar, which is underneath the bed I, and has two inclined projections, $q\,q$, on which the bed I rests. This bar L is allowed to slide or work freely in the upper part of the frame G, and it is connected at its inner end to a lever, M, which is shown clearly in Fig. 7.

To one of the arms of the wheel C there is attached, by a pivot, a pendent lever, N, which passes through a guide attached to the arm.

The bolts from which the shingles are sawed are fitted in the spaces between the strips $d$, and are clamped and held in position by the serrated jaws F, which are acted upon by the springs $f$. The bolts thus clamped pass, by the rotation of the wheel C, successively over the saw H, which cuts a shingle from the lower part of each bolt.

The taper form is given the shingles by the inclination of the bed I, on which the bolts drop just previous to coming in contact with the saw. The jaws F are drawn back to release the bolts and permit them to drop on a platform, O, on the frame G, and they are moved along on the platform to the bed I, and are then again clamped, the jaws F being drawn back in consequence of the rollers $k$ coming in contact with a projection, $t$, at the inner side of the rim $b$, the rollers passing off from said projection just as they come in line with the bed I, in order to allow the springs $f$ to throw the jaws F in contact with the bolts.

The bed I is tilted or inclined at every revolution of the wheel C by means of the lever N, attached to said wheel, the lever actuating the lever M on frame G, which lever M moves the sliding bar L, the inclined projections $q\ q$ of which move or tilt the bed, the latter being tilted or inclined first in one position and then in the other, the inclination being reversed at every revolution of wheel C, so that the shingles will be cut in taper form.

The saw-shaft B may be rotated by means of friction-wheels or gearing. I prefer the former.

By constructing the wheel C with brace-rods $a$, as shown, I avoid the use of friction-rollers to support said wheel, and hence get rid of much friction.

Having thus described my invention, I claim as new and desire to secure by Letters Patent—

1. The means employed for operating or tilting the bed I—to wit, the sliding bar L, provided with inclined projections $q\ q$, the lever M, attached to L, and the lever N, attached to wheel C, all arranged substantially as set forth.

2. The projection $t$ at the inner side of the rim $b$ of the wheel C, in connection with the cranks $h\ j$, springs $f$, and rollers $k$, all arranged substantially as shown, for operating the jaws F.

3. The sliding bar K, provided with arms $p\ p$, pivoted to pendants $o\ o$ of the plate $n$, which supports the bed I, for the purpose of raising and lowering said bed, as set forth.

4. The platform O, in combination with the tilting bed I, and the devices for releasing the jaw or dog from the bolt, substantially as described, for the purpose specified.

GEORGE CHALLONER.

Witnesses:
ELLIS THOMPSON,
LEVI B. LEWIS.